United States Patent
Kim

(10) Patent No.: US 7,507,124 B2
(45) Date of Patent: Mar. 24, 2009

(54) SECONDARY BATTERY MODULE

(75) Inventor: Yong-Sam Kim, Suwon-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 156 days.

(21) Appl. No.: 11/110,902

(22) Filed: Apr. 21, 2005

(65) Prior Publication Data

US 2005/0250386 A1 Nov. 10, 2005

(30) Foreign Application Priority Data

May 4, 2004  (KR) ...................... 10-2004-0031309
Mar. 29, 2005  (KR) ...................... 10-2005-0025916

(51) Int. Cl.
*H01R 24/00* (2006.01)
(52) U.S. Cl. ...................... 439/627; 439/510
(58) Field of Classification Search ................ 439/627, 439/510, 509, 507, 512, 931
See application file for complete search history.

(56) References Cited

U.S. PATENT DOCUMENTS

| | | | | |
|---|---|---|---|---|
| 1,215,004 A * | 2/1917 | Decker | ........................ | 429/158 |
| 3,061,662 A * | 10/1962 | Toce et al. | ..................... | 429/99 |
| 3,147,151 A * | 9/1964 | Toce | ........................... | 429/120 |
| 3,769,095 A * | 10/1973 | Schmidt | ..................... | 429/151 |
| 4,347,294 A * | 8/1982 | Mejia | ......................... | 429/151 |
| 4,455,356 A * | 6/1984 | Barrett, Jr. | .................... | 429/66 |
| 4,957,829 A | 9/1990 | Holl | | |
| 5,154,646 A * | 10/1992 | Shoup | ......................... | 439/772 |
| 5,378,552 A * | 1/1995 | Dixon, Jr. | ..................... | 429/91 |
| 6,328,604 B1 * | 12/2001 | Inoue et al. | ................. | 439/627 |
| 6,794,081 B2 * | 9/2004 | Heimer | ....................... | 429/121 |

FOREIGN PATENT DOCUMENTS

| | | |
|---|---|---|
| JP | 2-64169 | 5/1990 |
| JP | 08-298146 | 11/1998 |
| JP | 10-334870 | 12/1998 |
| JP | H11-120976 | 4/1999 |
| KR | 10-2004-0081327 | 9/2004 |

OTHER PUBLICATIONS

*Office action* from the Chinese Patent Office issued in Applicant's corresponding Chinese Patent Application No. 2005100679070 dated Jan. 19, 2007 along with its English translation.
Above-listed references were disclosed as a prior art in the Chinese Patent Publication No. CN 100421295 C issued on Sep. 24, 2008, in connection with the corresponding Chinese Patent Application No. 200510067907.0.

* cited by examiner

*Primary Examiner*—Renee S Luebke
*Assistant Examiner*—Xuong M Chung-Trans
(74) *Attorney, Agent, or Firm*—Robert E. Bushnell, Esq.

(57) ABSTRACT

A secondary battery module includes a plurality of unit cells, and a connector electrically connecting the unit cells to each other. The connector has a surface contact portion, and the shape of the surface contact portion corresponds to the shape of terminals of the unit cell. The connector is fastened to a terminal of the unit cell by insertion.

2 Claims, 7 Drawing Sheets

SECONDARY BATTERY MODULE

CLAIM OF PRIORITY

This application makes reference to, incorporates the same herein, and claims all benefits accruing under 35 U.S.C. 119 from two applications for letters patent entitled SECONDARY BATTERY AND SECONDARY BATTERY MODULE earlier filed respectively in the Korean Intellectual Property Office on 4 May 2004 and 29 Mar. 2005 and there, duly assigned Serial Nos. 10-2004-0031309 and 10-2005-0025916, respectively.

BACKGROUND OF THE INVENTION

1. Technical Field

The present invention relates to a secondary battery, and more particularly, to a secondary battery module of high power and bulk size in which the connecting structure between the unit cells is improved.

2. Related Art

The non-aqueous electrolyte secondary batteries of high energy density have recently been developing as high power secondary batteries.

Several to tens of the high power secondary cells (hereinafter "unit cell") are serially connected to form one module for motor drive of the machines requiring high power source such as hybrid electric vehicles.

The unit cell generally comprises an electrode assembly including a positive electrode, a negative electrode and a separator interposed between those two electrodes, a case having a space to receive the electrode assembly inside the case, a cap assembly fixed to the case to seal the case, and a positive terminal and a negative terminal protruding from the cap assembly to be electrically connected to the positive and negative electrodes of the electrode assembly.

To make a module, the unit cells are alternately arranged such that the positive terminal and the negative terminal of one unit cell are cross with the positive terminal and the negative terminal of the other unit cell being adjacent to the one unit cell, and the terminals are connected to each other by use of a conductive member.

While the conductive member is inserted into the terminal in order not to be separated from the terminal, it is fastened and fixed to the terminal by a nut. For this, a screw thread is formed on the outer circumference of the terminal.

As mentioned above, the conventional secondary battery module has several to tens of unit cells, which are electrically connected with the conductive member by the screw fixation method.

Since each terminal of the unit cell in the secondary battery module needs screw fixation, workload for manufacturing a module is high and large amount of time is required. Accordingly, the productivity is decreased.

In addition, when some unit cells in the secondary battery module do not work properly, it is necessary to separate the malfunctioning unit cells from the other to replace them with new unit cells or the repaired unit cells. However, this requires unscrewing the nut from the terminal and then screwing the nut to the terminal, which is inconvenient so that the manufacturing efficiency is decreased.

In addition, since the conventional conductive member has a plate shape, the contact area can not be increased when the conductive member contacts the terminal. Accordingly, it has a problem that the electrical conductivity between the terminal and the conductive member is lowered.

Especially, as the secondary battery module used for motor driven devices such as a hybrid electric vehicle requires tens of unit cells, the above problems are more serious.

SUMMARY OF THE INVENTION

It is therefore an object of the present invention to provide an improved secondary battery module.

It is further an object of the present invention to provide a secondary battery module in which the connecting structure of unit cells is simplified to save time and effort in connection and replacement work when plural unit cells are connected to form a bulk size battery module.

It is also an object of the present invention to provide a secondary battery module in which contact area with a terminal is maximized to enhance the electrical conductivity when unit cells are connected.

According to one aspect of the present invention, a secondary battery module comprises a plurality of unit cells and a connector electrically connected between terminals of the unit cells, wherein the connector has a surface contact portion and the surface contact portion corresponds to and is fastened to the terminal of the unit cell by insertion.

The surface contact portion can be a groove. In addition, the surface contact portion can be a hole.

The surface contact portion can be fastened to the terminal by forced insertion.

Further, in the case that the surface contact portion is the hole, the connector can be fixed to the terminal inserted into the hole by welding.

The secondary battery module can be for a motor driven device.

The connector is connected between the positive terminal or the negative terminal of one unit cell and the negative terminal or the positive terminal of the adjacent unit cell. Accordingly, the connector has two grooves or holes spaced apart by the same distance as that of the terminals between the unit cells.

The groove or hole formed in the connector has the same cross-sectional shape as that of the terminal. It is preferable that the size of the groove or hole is the same or less than that of the terminal and thereby the connector is fastened to the terminal by forced insertion to be closely contacted and to increase fixing strength.

The unit cell includes an electrode assembly including a positive electrode, a negative electrode and a separator interposed between those two electrodes; a case having a space to receive the electrode assembly inside the case; a cap assembly fixed to the case to seal the case; and a positive terminal and a negative terminal protruding outside the cap assembly, the positive and negative terminals being electrically connected to collectors of the positive and negative electrodes.

The unit cells of the battery module are serially connected to each other.

The depth of the groove or hole formed in the connector is less than the length of the terminal, and thereby a gap is formed between the lower end of the connector and the cap assembly where the terminal is disposed, which prevents electrical connection between the cap assembly of metallic material and the connector.

Further, it is preferable that a nonconductor of insulating material can be disposed between the cap assembly and the connector.

Preferably, the terminal has a coating layer on the surface thereof which is made of material with the high electrical conductivity such as silver to increase the conductivity.

The terminal and the groove or hole of the connector corresponding to the terminal have a round-shaped or square-shaped cross-section but their shape is not limited thereto. For example, the groove or hole can have a polygonal structure such as pentagon, hexagon, etc., or spline or cross structure to maximize contact area.

In addition, according to another aspect of the present invention, the thickness of the terminal-receiving portions of the connector where the groove or hole is formed is thicker than that of the bridge connecting the terminal-receiving portions.

This allows the bridge of the connector to be bent more easily. Accordingly, if the spaces between the terminals of the adjacent unit cells are different due to the tolerance, the bridge of the connector becomes bent to insert the connector between the terminals.

It is preferable that the bridge has at least a gutter, which enables the bridge to be bent far more easily.

The shape of the gutter is not limited to a shape, and it can have various shapes such as a circular arc, triangle or square.

In the meantime, according to another aspect of the present invention, the size of the cross-section of the groove or hole becomes continuously smaller along one direction thereof to form an inclined plane.

The terminal also has an inclined plane with the same slope as that of the groove or hole along the length direction.

Accordingly, the terminals are inserted into the grooves or holes of the connector so that two adjacent unit cells are serially connected, and the connector is fastened and fixed to the unit cells by the strong frictional force between the inner circumference of the groove or hole of the connector and the outer circumference of the terminal.

BRIEF DESCRIPTION OF THE DRAWINGS

A more complete appreciation of the present invention, and many of the above and other features and advantages of the present invention, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Reference will now be made in detail to the embodiments of the present invention, examples of which are illustrated in the accompanying drawings. The embodiments are described below to explain the present invention by referring to the figures.

Figure 1:
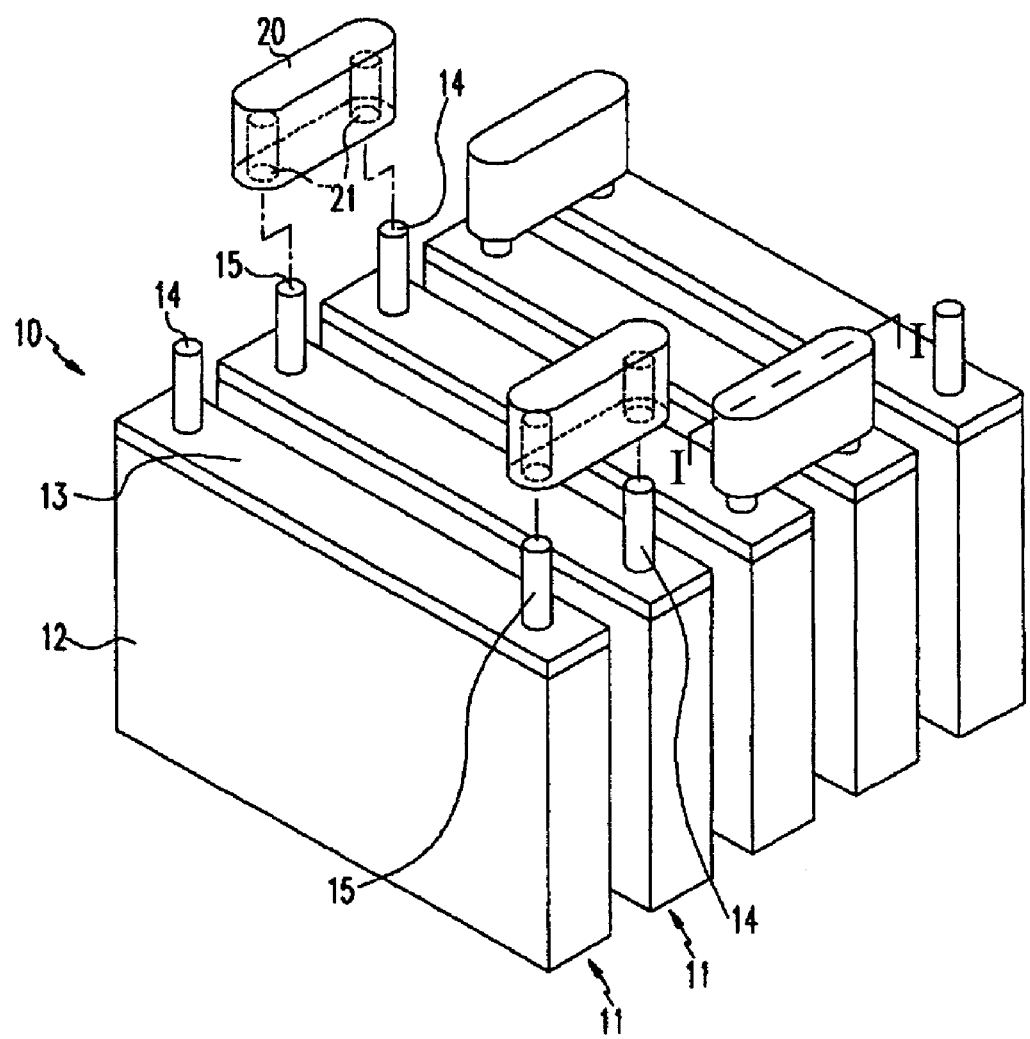
FIG. 1 is an exploded perspective view of a secondary battery module according to a first embodiment of the present invention.
Figure 2:
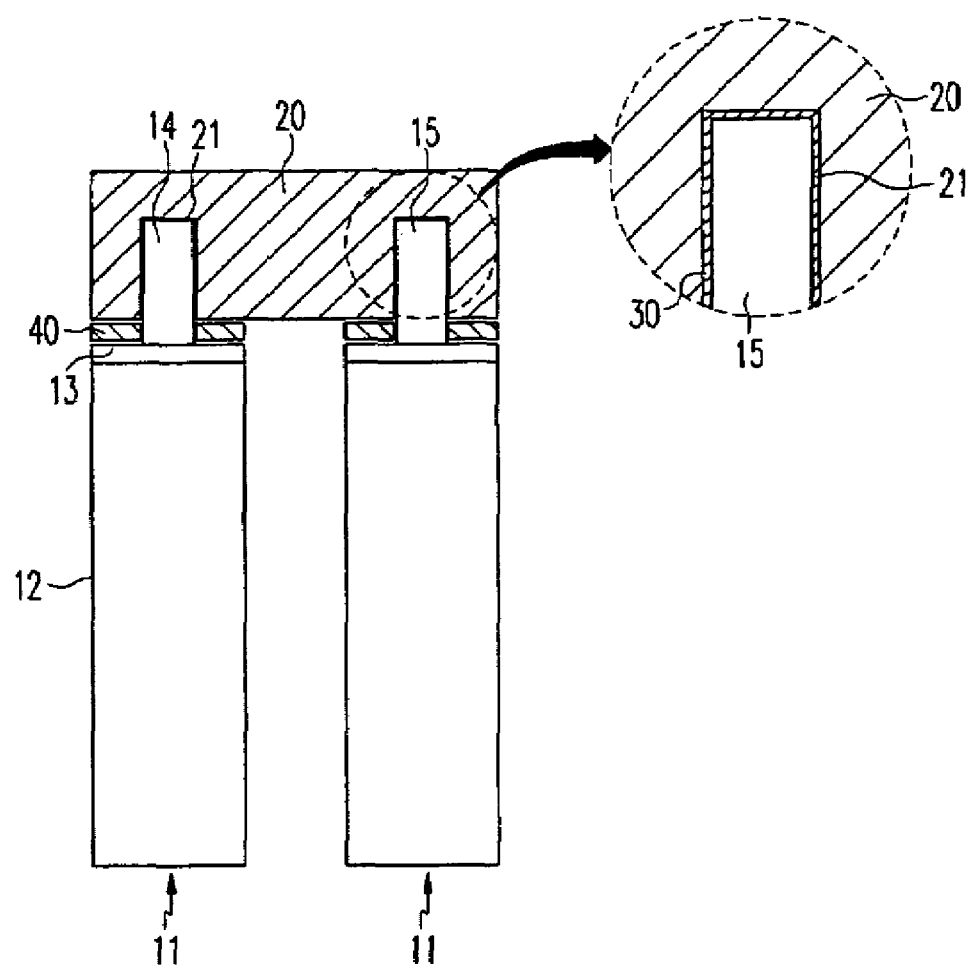
FIG. 2 is a partial cross-sectional side view taken along the line I-I of FIG. 1.
Figure 3A:
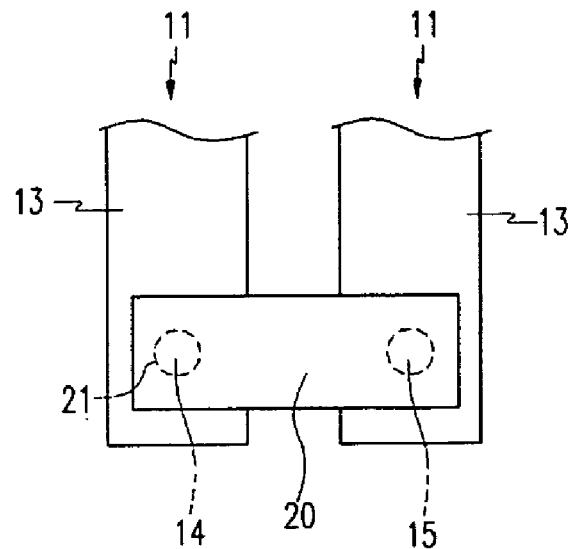
FIG. 3A, FIG. 3B, FIG. 3C and FIG. 3D are partial plan views of the secondary battery modules according to the shapes of a groove of a connector and a terminal of the first embodiment of the present invention.

FIG. 1 is an exploded perspective view of a secondary battery module according to a first embodiment of the present invention, FIG. 2 is a partial cross-sectional side view taken along the line I-I of FIG. 1, and FIG. 3A is a partial plan view of the secondary battery modules according to the shapes of a groove of a connector and a terminal of the first embodiment of the present invention.

Figure 1A:
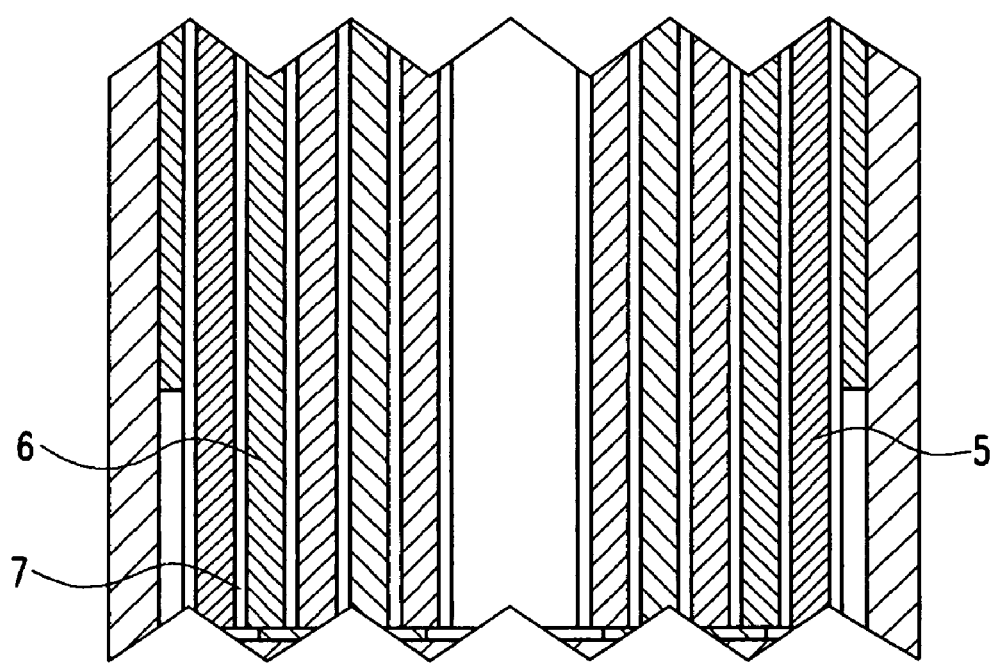
FIG. 1A is an exemplary partial cross-sectional illustration of a positive electrode, a negative electrode and a separator interposed between those two electrodes.

A bulk size secondary battery module 10 includes unit cells 11, each of which has an electrode assembly including a positive electrode, a negative electrode and a separator interposed between those two electrodes (an exemplary illustration of a positive electrode 5, a negative electrode 6 and a separator 7 is shown in FIG. 1A), a case 12 having a space to receive the electrode assembly inside the case, a cap assembly 13 fixed to the case 12 to seal the case; and a positive terminal 14 and a negative terminal 15 protruding outside the cap assembly, the positive and negative terminals being electrically connected to collectors of the positive and negative electrodes.

The case 12 is made of conductive metal such as aluminum, aluminum alloy, and steel plated with nickel, and its shape can be a hexahedron, etc. which have an inner space to receive the electrode package.

In the present embodiment, each unit cell 11 has the structure such that two terminals, i.e. the positive terminal 14 and the negative terminal 15, protrude over the cap assembly 13 as being spaced apart at a predetermined distance.

To form the bulk size battery module 10, each unit cell 11 with the above structure is disposed such that the terminals 14 and 15 face upwardly, and the positive terminal 14 and the negative terminal 15 one after another protruding over the cap assembly 13 of one unit cell 11 with the positive terminal 14 and the negative terminal 15 of the adjacent unit cell 11.

Accordingly, terminal columns are formed by alternating and spacing apart the positive terminal and the negative terminal at a predetermined distance in both ends with respect to the center of the unit cell 11.

That is, the terminal column is a line formed by linearly arranging the terminals with alternating polarity.

In the battery module with the above structure, the secondary battery module of the present invention has a connector 20 electrically connecting the positive electrode 14 and the negative electrode 15 between the adjacent unit cells 11 to serially connect the unit cells 11 to each other.

The connector 20 has a groove 21 formed in a position which corresponds to the terminals 14 and 15 of each unit cell, and is fastened to each terminal by insertion.

The groove 21 formed in the connector 20 has the same cross-sectional shape as that of the terminal, its size is the same or little less than that of the terminal, thereby the connector 20 is fastened to the terminals 14 and 15 by forced insertion.

Accordingly, when the connector 20 is fastened to the terminals, the terminals are forcefully inserted into the grooves 21 of the connector 20, and thereby the connector 20 is fastened and fixed to the terminals by close contact and strong frictional force between the inner circumference of the groove 21 of the connector 20 and the outer circumference of the terminals 14 and 15.

That is, the terminal is inserted into the groove 21 of the connector 20, the inner surface of the groove 21 is contacted with the outer circumference of the terminal, and the frictional force generated between both of the contacting surfaces maintains the installing status of the connector 20 in the unit cell.

Accordingly, the unit cells 11 can be electrically connected to each other by simply inserting the terminal into the connector to form the battery module 10, and the unit cell can be easily replaced by pulling out the fastened connector 20 from the terminal.

To insert the terminal to the groove 21 of the connector 20 or to pull out the connector 20 from the terminal, additional tools such as hammer can be used.

FIG. 1 shows that the connector 20 is installed in the battery module. As shown in the drawing, the positive terminal 14 of one unit cell 11 and the negative terminal 15 of the adjacent unit cell 11 are inserted into the connector 20 to be electrically connected to each other, and the positive terminal 14 of the adjacent unit cell 11 located in the other terminal column and the negative terminal 15 of the next unit cell 11 are connected through the connector 20, and thereby the entire unit cells 11 are serially connected.

The depth of the groove 21 formed in the connector 20 is less than the length of the terminals 14 and 15.

Accordingly, when the connector 20 is installed in the terminals 14 and 15 of the unit cell, there is formed a gap at the lower end of the terminal, that is, between the lower end of the connector 20 and the cap assembly 13, even though the terminal is fully inserted into the groove 21 of the connector 20.

The gap makes the connector 20 and the cap assembly 13 spaced apart not to be electrically connected to each other.

Accordingly, it can prevent electrical connection between the cap assembly 13 of metallic material and the connector 20.

Further, as shown in FIG. 2, it is preferable that a nonconductor 40 of insulating material is inserted between the cap assembly and the connector 20.

The non conductor 40 is made of material which is not electrically conductive, and the nonconductor is installed in the terminal separately. The nonconductor has a hole at the center thereof to be inserted into the terminal.

Such insertion of the nonconductor between the connector 20 and the cap assembly can certainly prevent the electrical connection between the connector 20 and the cap assembly which happens to occur.

In comparison with the conventional battery module, such a secondary battery module with the above structure increases contact area since the whole inner surface of the groove 21 of the connector 20 contacts the terminal, and accordingly, the conductivity between the connector 20 and the terminals 14 and 15 can be maximized.

Moreover, to increase the conductivity, the secondary battery module further includes a coating layer 30 on the surface of the terminal and/or the inner surface of the groove 21 of the connector 20, which is made of material with the high electrical conductivity such as silver (Ag).

Figure 3B:
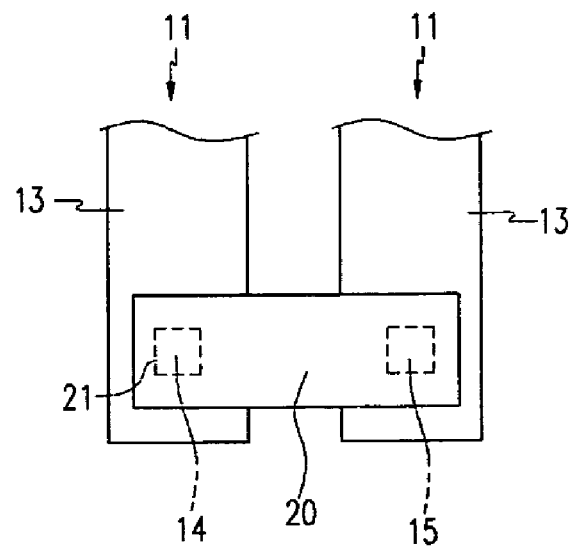
Figure 3C:
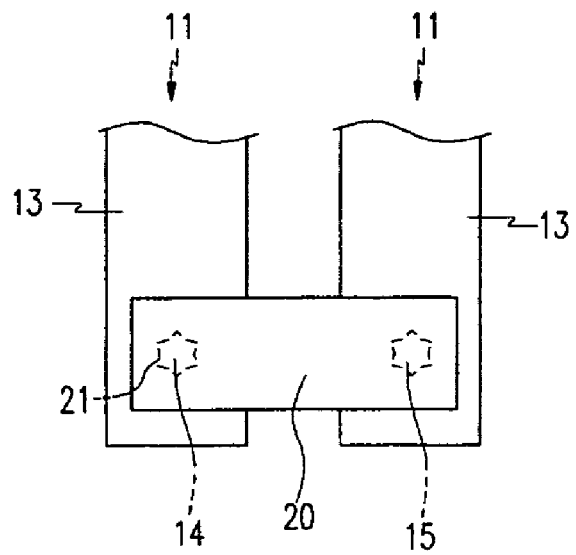
Figure 3D:
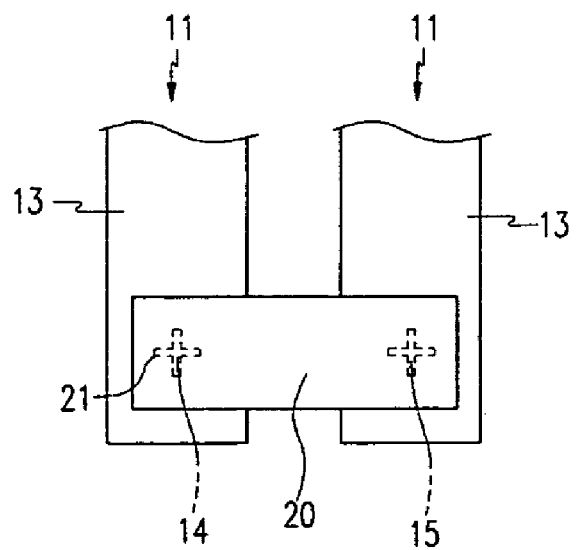

As shown in FIG. 3A, in the present embodiment, the groove 21 of the connector 20 and the terminals 14 and 15 have a round-shaped cross-section but they are not limited thereto. For example, they can have a square, spline or cross-shaped cross-section as shown in FIGS. 3B to 3D.

In the meantime, according to another embodiment of the present invention, the terminal formed in the unit cell and the groove of the connector where the terminal is inserted have an inclined plane with the same slope angle along the length direction to facilitate installation and separation of the connector.

The details in which the cross-sectional shape of the groove and the terminal is round, as one example, will be described in the following. However, the present invention is not limited to the round shape, and all other terminals and grooves with various cross sectional shapes mentioned above can be used.

Figure 4:
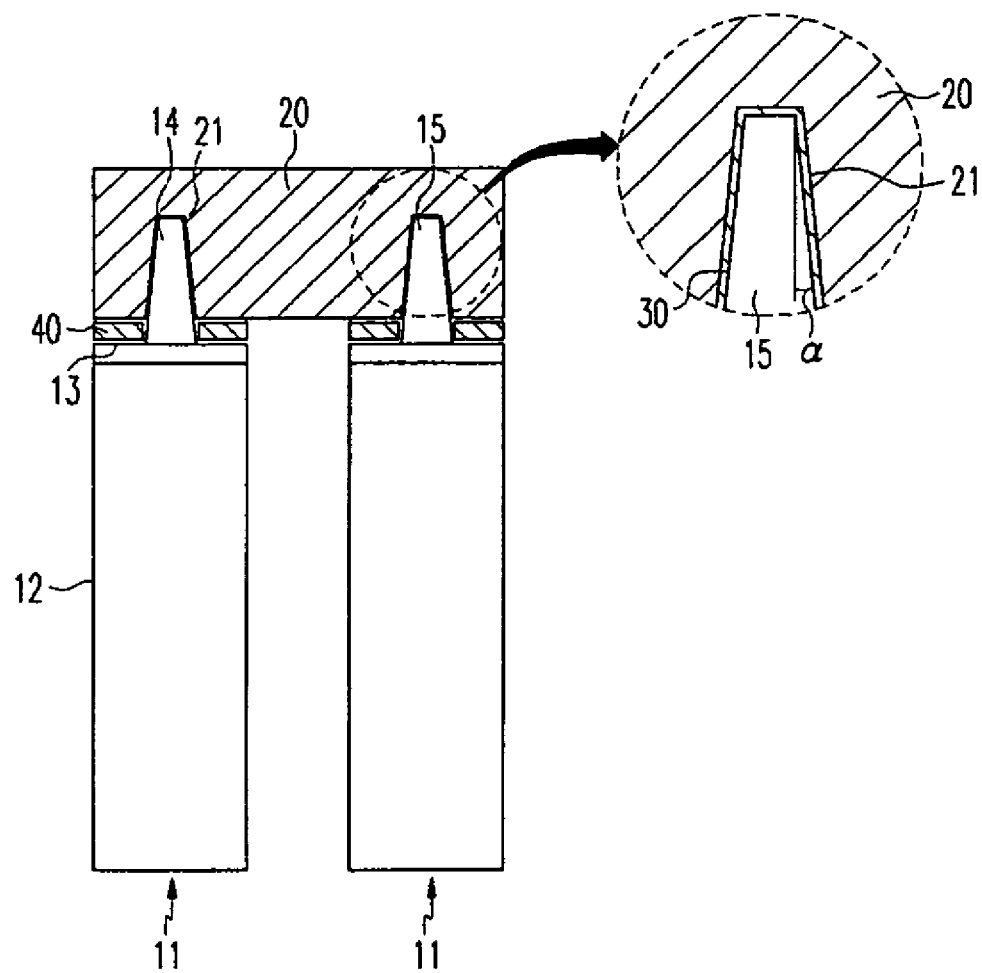
FIG. 4 is a partial cross-sectional side view of a secondary battery module according to a second embodiment of the present invention.

As shown in FIG. 4, the diameter of the terminals 14 and 15 formed on the unit cell 11 becomes gradually smaller along the length direction from one end to the other end (from the front end to the free end of the cap assembly in the drawing), and therefore, the terminals have an inclined plane with a predetermined slope angel ($\alpha$). Also, the diameter of the groove 21 of the connector 20 where the terminals 14 and 15 are inserted becomes continuously smaller along the length direction toward the inside at the same slope angle as the above slope angle ($\alpha$), and therefore, it has an inclined plane with the same slope.

Since the diameter of the terminal portion is smaller than the diameter of the groove 21 portion when the terminal is initially inserted into the groove 21 of the connector 20, the terminal can be easily inserted into the groove 21. Finally, the surface of the outer circumference of the terminals 14 and 15 are closely contacted with the inner surface of the groove 21, and the frictional force therefrom fixes the connector 20 to the terminal.

The terminal and the groove 21 can have the inclined plane on only one surface with respect to the center line thereof, respectively, to have a gradient, or can have the inclined planes symmetrically on both surfaces facing each other to form a taper. However, there is no special limitation thereto except that the inclined plane is continuous.

The reference numeral 30 in FIG. 4 is the coating layer which is coated on the surface of the terminal and/or the inner surface of the groove 21 to increase the conductivity between the terminal and the connector 20. The coating layer is preferably made of silver, but it is not limited thereto. The reference numeral 40 is the nonconductor which is inserted between the connector 20 and the cap assembly 13 to insulate these two members.

Figure 5:
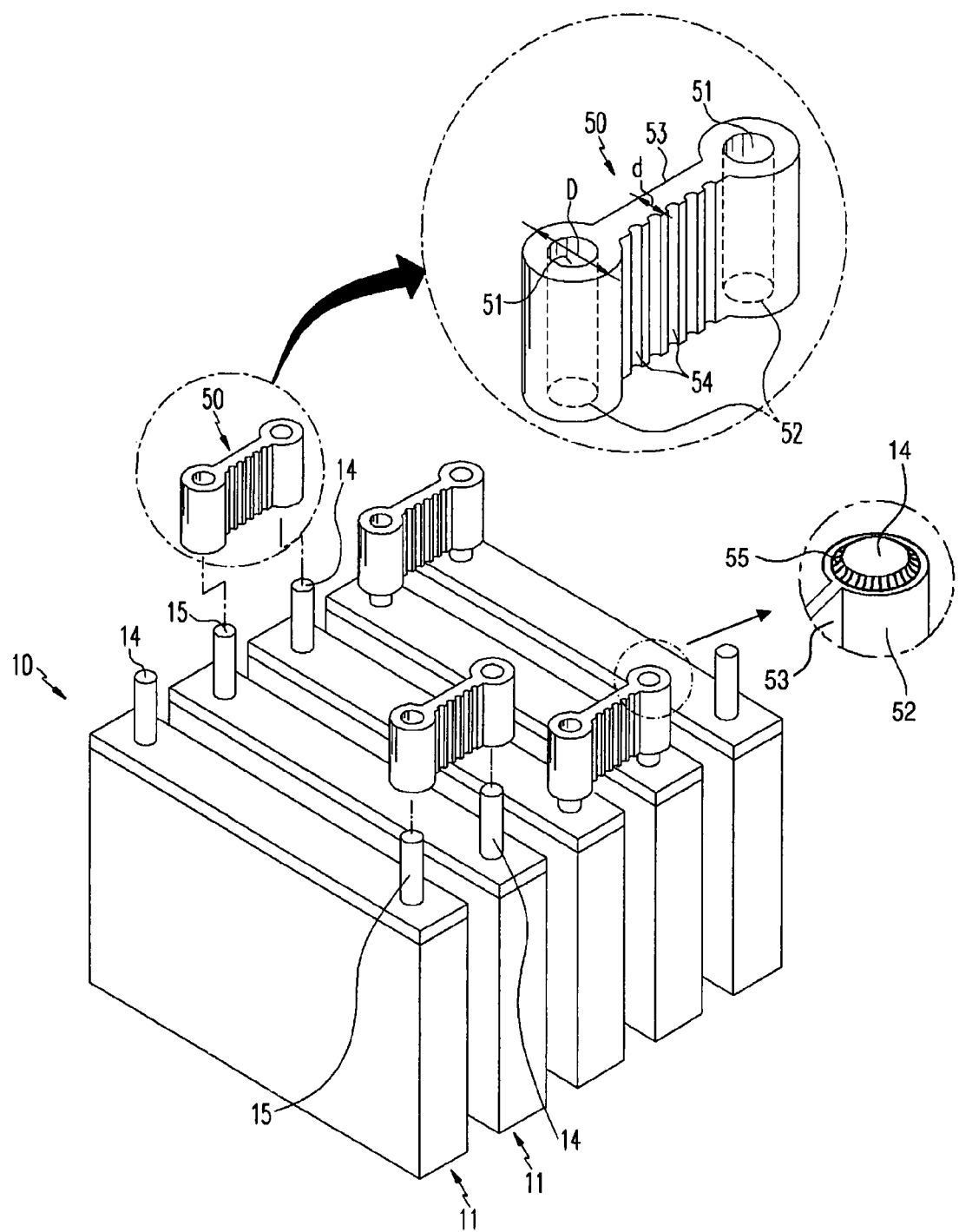
FIG. 5 is an exploded perspective view of a secondary battery module according to a third embodiment of the present invention.

FIG. 5 shows a connector according to another embodiment of the present invention.

As shown in FIG. 5, the connector 50 has a pair of terminal-receiving portions 52 having a pair of holes 51 corresponding to each of the terminals 14 and 15 of the adjacent unit cells 11, and thereby the terminals 14 and 15 are inserted into the holes 51. The pair of terminal-receiving portions 52 are bridged to each other by a bridge 53.

The hole 51 formed on the connector 50 has the same cross-section as that of the terminals 14 and 15, the size thereof is the same or less than that of the terminals, and thereby the connector 50 is fastened to the terminals 14 and 15 by forced insertion.

In the present invention, the terminals 14 and 15 exposed through the holes 51 are welded to the connector 50 so that the fixing strength may be increased by a welded portion 55.

The thickness (D) of the terminal-receiving portions 52 where the holes 51 are formed is thicker than the thickness (d) of the bridge 53 connecting the terminal-receiving portions 52 where the holes 51 are formed.

Accordingly, in the case that the spaces between the terminals 14 and 15 of the adjacent unit cells 11 are different due to the tolerance, the bridge 53 of the connector 50 becomes easily bent to adjust the spaces between the holes 51 of the connector 50, which facilitates inserting the connector 50 between the terminals 14 and 15.

Preferably, the bridge 53 of the connector 50 has plural gutters 54 to far more easily bend the bridge 53 of the connector 50.

The cross-sectional shape of the gutter 54 formed in the bridge 53 is a circular arc, but it is not limited thereto and can have various shapes such as a triangle or square.

Accordingly to the present invention, the connector can be easily fastened to the battery, and the unit cell can be easily disassembled and replaced with a desired unit cell when fixed.

In addition, the present invention enhances the conductivity between the terminal and the connector of the unit cell to maximize the battery capacity.

Moreover, according to the present invention, since the unit cells can be connected through one part, installation is easy, work load is reduced, and cost is saved by reduction of the number of parts.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A secondary battery module, comprising:
   a plurality of unit cells, each of the plurality of unit cells having a metal case and terminals; and
   a connector electrically connecting the unit cells to each other, the connector comprising a pair of terminal-receiving portions having a pair of holes and a bridge connecting the pair of terminal-receiving portions, the pair of terminal-receiving portions being thicker than the bridge in a top view, a size of each of the pair of holes being the same or less than the size of each of the terminals, the terminals inserted into the pair of holes by forced insertion wherein the bridge has gutters to be easily bent to adjust spaces between the holes of the connector.

2. The secondary battery module of claim 1, wherein the connector is welded to the terminals.

* * * * *